(12) United States Patent
Kanaoka et al.

(10) Patent No.: US 11,604,616 B2
(45) Date of Patent: Mar. 14, 2023

(54) PROCESSING JOB GENERATION APPARATUS AND SHEET PROCESSING SYSTEM

(71) Applicant: DUPLO SEIKO CORPORATION, Kinokawa (JP)

(72) Inventors: Hiromichi Kanaoka, Kinokawa (JP); Kenta Yamada, Kinokawa (JP)

(73) Assignee: DUPLO SEIKO CORPORATION, Kinokawa (JP)

( * ) Notice: Subject to any disclaimer, the term of this patent is extended or adjusted under 35 U.S.C. 154(b) by 0 days.

(21) Appl. No.: 17/063,832

(22) Filed: Oct. 6, 2020

(65) Prior Publication Data
US 2021/0103412 A1 Apr. 8, 2021

(30) Foreign Application Priority Data
Oct. 7, 2019 (JP) .............................. JP2019-184489

(51) Int. Cl.
*G06F 3/12* (2006.01)

(52) U.S. Cl.
CPC ............ *G06F 3/126* (2013.01); *G06F 3/1207* (2013.01); *G06F 3/1276* (2013.01)

(58) Field of Classification Search
CPC ...... G06F 3/126; G06F 3/1276; G06F 3/1207; G06F 3/1205; G06F 3/1252; G06F 3/1256; G06F 3/1285; G06F 3/1264
See application file for complete search history.

(56) References Cited

U.S. PATENT DOCUMENTS

| | | | |
|---|---|---|---|
| 2011/0149315 A1* | 6/2011 | Yamazaki | H04N 1/3873 358/1.9 |
| 2012/0002231 A1* | 1/2012 | Nagahara | H04N 1/3873 358/1.13 |
| 2014/0018224 A1* | 1/2014 | Kuranoshita | G03G 15/5025 493/405 |
| 2014/0309095 A1* | 10/2014 | Kuranoshita | G06F 3/1256 493/405 |
| 2014/0355011 A1* | 12/2014 | Seto | G06F 3/1282 358/1.2 |
| 2019/0286383 A1* | 9/2019 | Ito | G06F 3/1286 |
| 2020/0012465 A1* | 1/2020 | Oiwa | G06F 3/1255 |
| 2021/0026585 A1* | 1/2021 | Fujita | H04N 1/00411 |

FOREIGN PATENT DOCUMENTS

EP 2808779 A1 12/2014
JP 2018074517 A 5/2018

OTHER PUBLICATIONS

The Extended European Search Report dated Mar. 4, 2021, by the European Patent Office in corresponding European Application No. 20200131.9 (7 pages).

* cited by examiner

*Primary Examiner* — Iriana Cruz
(74) *Attorney, Agent, or Firm* — Buchanan Ingersoll & Rooney PC

(57) ABSTRACT

A processing job generation apparatus includes an acquisition unit that acquires first information on a print image, and a processing position setting unit that causes a print image and a processing mark indicating a processing position of processing to be performed on the sheet to be simultaneously displayed on the display device, and sets a processing position on basis of the print image and the processing mark displayed on the display device.

18 Claims, 16 Drawing Sheets

PROCESSING JOB GENERATION APPARATUS AND SHEET PROCESSING SYSTEM

BACKGROUND OF THE INVENTION

Field of the Invention

The present invention relates to a processing job generation apparatus and a sheet processing system.

Description of the Related Art

Patent Document 1 discloses an image forming apparatus capable of suppressing output of an output product having a poor finish.

Patent Document 1: Japanese Patent Application Laid-Open No. 2018-74517

The image forming apparatus is configured such that superimposition determination processing of determining whether a target position to be subjected to post-processing overlaps an image region where an image exists is performed, and when it is determined that the target position overlaps the image region, printing based on input image data is suspended, and a preview image of an output product obtained when the post-processing is performed on the target position is generated as a first preview image. As described above, when the post-processing is performed on the output product, it is important to accurately grasp a relationship between the image and the target position.

By the way, generally, in a sheet processing apparatus, a processing position is designated with reference to an edge of a sheet to be processed. For this reason, it may be difficult to set the processing position for the print image printed on the sheet, and a processing job may not be easily generated.

SUMMARY OF THE INVENTION

It is an object of the present invention to provide a processing job generation apparatus that can easily recognize a processing position for a print image on a sheet and can easily generate a processing job, and a sheet processing system including the processing job generation apparatus.

A processing job generation apparatus according to an aspect of the present invention is a processing job generation apparatus that generates, using a display device, a processing job of a sheet processing apparatus capable of processing a sheet on which a print image Is printed according to the processing job, the processing job generation apparatus including: an acquisition unit that acquires first information on the print image; and a processing position setting unit that causes the print image and a processing mark indicating a processing position of processing to be performed on the sheet to be simultaneously displayed on the display device, and sets the processing position on the basis of the print image displayed on the display device, wherein the processing job generation apparatus generates the processing job on the basis of the first information and the processing position that has been set.

The processing job generation apparatus of the aspect described above may further adopt the configurations as below.

(1) The processing position setting unit causes the print image and the processing mark to be displayed on the display device in a state of overlapping with each other.

(2) The processing position setting unit, when a distance between the processing mark and an image mark set in the print image is equal to or less than a predetermined value, automatically moves the processing mark to match the processing mark with the image mark.

(3) The acquisition unit acquires second information on the sheet including a size, and the processing position setting unit causes at least one processing mark set including the at least one processing mark and a sheet image representing an outer shape of the sheet to be displayed on the display device in a state of overlapping with each other.

(4) The acquisition unit acquires second information on the sheet including a size, and the processing position setting unit causes the at least one processing mark set, the at least one print image corresponding to the at least one processing mark set, and the sheet image to be displayed on the display device in a state of overlapping with each other.

(5) The acquisition unit acquires second information on the sheet including a size, and the processing position setting unit causes at least one processing mark set including the at least one processing mark and the print image associated with the second information to be displayed on the display device in a state of overlapping with each other.

(6) The processing position setting unit changes a size of the sheet displayed on the display device according to the size of the sheet acquired by the acquisition unit.

(7) The print image includes at least one product image, the acquisition unit acquires third information on a product including a size of the product image, and the processing position setting unit causes a processing mark set including the at least one processing mark associated with the third information and the print image to be displayed on the display device in a state of overlapping with each other.

(8) The third information includes the size of the product image and a position of the product image.

(9) The acquisition unit acquires third information on a product including imposition settings, and the processing position setting unit causes a processing mark set including the processing mark corresponding to the imposition settings and the print image to be displayed on the display device in a state of overlapping with each other.

(10) The third information includes the imposition settings and the size of the product image.

(11) The third information includes the imposition settings and the position of the product image.

(12) The third information includes the imposition settings, the size of the product image, and the position of the product image.

(13) The acquisition unit acquires fourth information on a blank region of the print image in which the product image is not arranged, from the third information, and the processing position setting unit causes the processing mark set associated with the fourth information and the print image to be displayed on the display device in a state of overlapping with each other.

(14) The print image includes at least one product image, the acquisition unit acquires fourth information on a blank region of the print image in which the product image is not arranged, the fourth information includes a distance between an outline of the sheet and an outline of the product image, and the processing position setting unit causes a processing mark set including the at least one processing mark associated with the fourth information and the print image to be displayed on the display device in a state of overlapping with each other.

(15) The print image includes a plurality of the product images, and the fourth information includes a distance between outlines of adjacent product images of the plurality of product images.

(16) The processing position setting unit is configured to make the position of the processing mark settable on the basis of an input numerical value.

(17) An output unit that outputs the processing job to an outside of the processing job generation apparatus is further provided, and the processing job output by the output unit includes only the processing position, the processing position and a processing type, the processing position and the first information, or the processing position, the processing type, and the first information.

A sheet processing system according to an aspect of the present invention includes a processing job generation apparatus according to the aspect described above, and the sheet processing apparatus, wherein the sheet processing apparatus processes the sheet on the basis of the processing job generated by the processing job generation apparatus.

The sheet processing system of the aspect described above may further adopt the configurations as below.

(18) The sheet processing system further includes a printing apparatus that prints the print image on the sheet on the basis of the processing job to generate a printed sheet, and the sheet processing apparatus processes the printed sheet generated by the printing apparatus on the basis of the processing job.

(19) The sheet processing system further includes a print image editing apparatus that performs imposition on the basis of the processing job generated by the processing job generation apparatus.

According to the processing job generation apparatus of the aspect described above, a print image and a processing mark indicating a processing position of processing to be performed on a sheet are simultaneously displayed on a display device, the processing position is set on the basis of the print image displayed on the display device, and a processing job is generated on the basis of first information on the print image and the processing position that has been set. With such a configuration, the processing position for the print image on the sheet can be intuitively and easily grasped, so that it is possible to achieve a processing job generation apparatus that can easily generate a processing job.

According to the configuration (1), the processing position for the print image on the sheet can be more easily grasped, so that it is possible to achieve a processing job generation apparatus that can easily create a processing job.

According to the configuration (2), the processing mark and the image mark can be easily matched, so that the processing job can be generated more easily.

According to the configuration (3), the position of the processing mark with respect to the sheet can be intuitively and easily grasped.

According to the configuration (4), the positions of the print image and the set of processing marks with respect to the sheet can be intuitively and easily grasped.

According to the configuration (5), the position of the processing mark with respect to the sheet and the print image can be intuitively and easily grasped.

According to the configuration (6), it is not necessary to change the size of the sheet according to the size of the print image, so that the processing job can be generated more easily.

According to the configurations (7) to (15), the position of the set of "the product image and the processing mark" with respect to the print image on the sheet can be intuitively and easily grasped.

According to the configuration (16), fine adjustment, which is difficult with a pointing device or the like, can be easily performed by inputting a numerical value. As a result, the position of the processing mark can be set more accurately.

According to the configuration (17), the generated processing job can be output.

According to the sheet processing system of the aspect described above, it is possible to achieve a sheet processing system that can easily process a sheet by a processing job generation apparatus.

According to the configurations (18) and (19), the sheet can be processed easily and with high accuracy.

DESCRIPTION OF THE PREFERRED EMBODIMENT(S)

Hereinafter, an example of the present disclosure will be described with reference to the accompanying drawings. In the following description, terms (for example, terms including "upper", "lower", "right", "left", "front", and "rear") indicating a specific direction or position are used as necessary. However, the use of these terms is for facilitating the understanding of the present disclosure with reference to the drawings, and the technical scope of the present disclosure is not limited by the meaning of the terms. The following description is merely exemplary in nature and is not intended to limit the present disclosure, the application thereof, or the usage thereof. The drawings are schematic, and the ratios of the respective dimensions and the like do not always match the actual ones.

Figure 1:
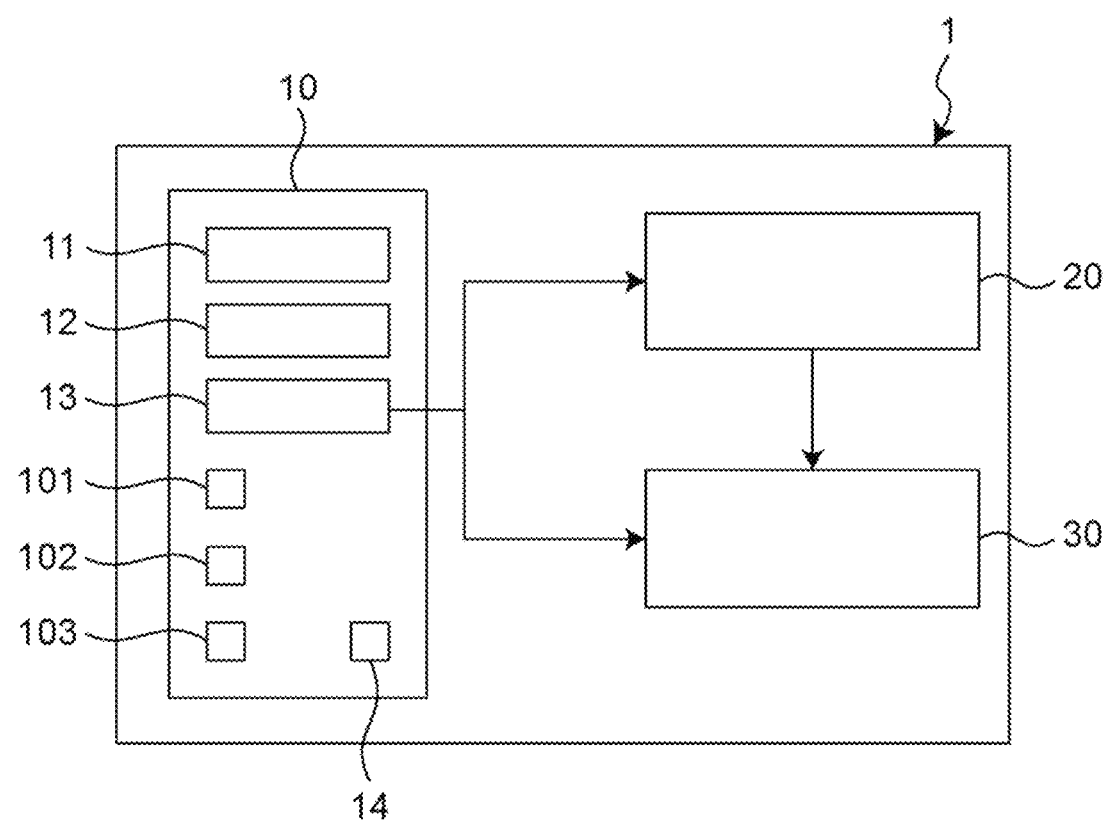
FIG. 1 is a block diagram showing a sheet processing system including a processing job generation apparatus according to an embodiment of the present invention.

As shown in FIG. 1, a processing job generation apparatus 10 according to an embodiment of the present invention constitutes, as an example, a sheet processing system 1 together with a printing apparatus 20 and a sheet processing apparatus 30. In the sheet processing system 1, the processing job generation apparatus 10, the printing apparatus 20, and the sheet processing apparatus 30 are communicably connected to each other via a network. The printing apparatus 20 is configured to perform printing on a sheet on the basis of a processing job generated by the processing job generation apparatus 10 to generate a printed sheet. The sheet processing apparatus 30 is configured to process the printed sheet printed by the printing apparatus 20 on the basis of the processing job generated by the processing job generation apparatus 10.

The processing job generation apparatus 10 includes a CPU 11 that performs operation and the like, a storage unit 12, and an output unit 13, and uses a display device 14 to generate a processing job. In this embodiment, the display device 14 constitutes a part of the processing job generation apparatus 10. The processing job generation apparatus 10 may not include the display device 14. In this case, for example, an external display may be used or a display device (not shown) of the sheet processing apparatus 30 may be used. The processing job includes information such as a size and type of the sheet, a size and arrangement of the print image, a position, type, number, and dimension of the processing performed on the sheet. That is, the information included in the processing job may be only information on the processing position, a combination of the processing position and the processing type, a combination of the processing position and the print image, or a combination of the processing position, the processing type and the print image. The storage unit 12, for example, is composed of a ROM and a RAM, and stores a program, data or the like necessary for generating a processing job or the like. The output unit 13 outputs the generated processing job to an outside of the processing job generation apparatus 10 (for example, the printing apparatus 20 and the sheet processing apparatus 30).

The processing job generation apparatus 10 also includes an acquisition unit 101, a processing position setting unit 102, and a processing job generation unit 103. Each of the acquisition unit 101, the processing position setting unit 102, and the processing job generation unit 103 is a function achieved by the CPU 11 executing a predetermined program, for example.

The acquisition unit 101 acquires first information on a print image to be printed on a sheet. The first information is stored in, for example, the storage unit 12 or an external device (not shown). The external device is, for example, a personal computer, a smartphone, or a tablet PC, and is connected to the acquisition unit 101 via a network.

The processing position setting unit 102 causes a print image to be printed on a sheet and a processing mark indicating a processing position of processing to be performed on the sheet (for example, vertical cutting processing, horizontal cutting processing, perforation processing, vertical crease processing, horizontal crease processing, rounding processing, embossing, pseudo-bonding, gluing, or bookbinding) to be simultaneously displayed on the display device 14, and sets the processing position on the basis of the print image displayed on the display device 14. The processing position is set by the processing position setting unit 102, for example, as shown in FIGS. 2 to 16. The processing position is set using, for example, a pointing device (for example, a mouse, a trackball, a touch panel, a touch pad, or a stylus pen), a keyboard or a cursor key.

Figure 2:
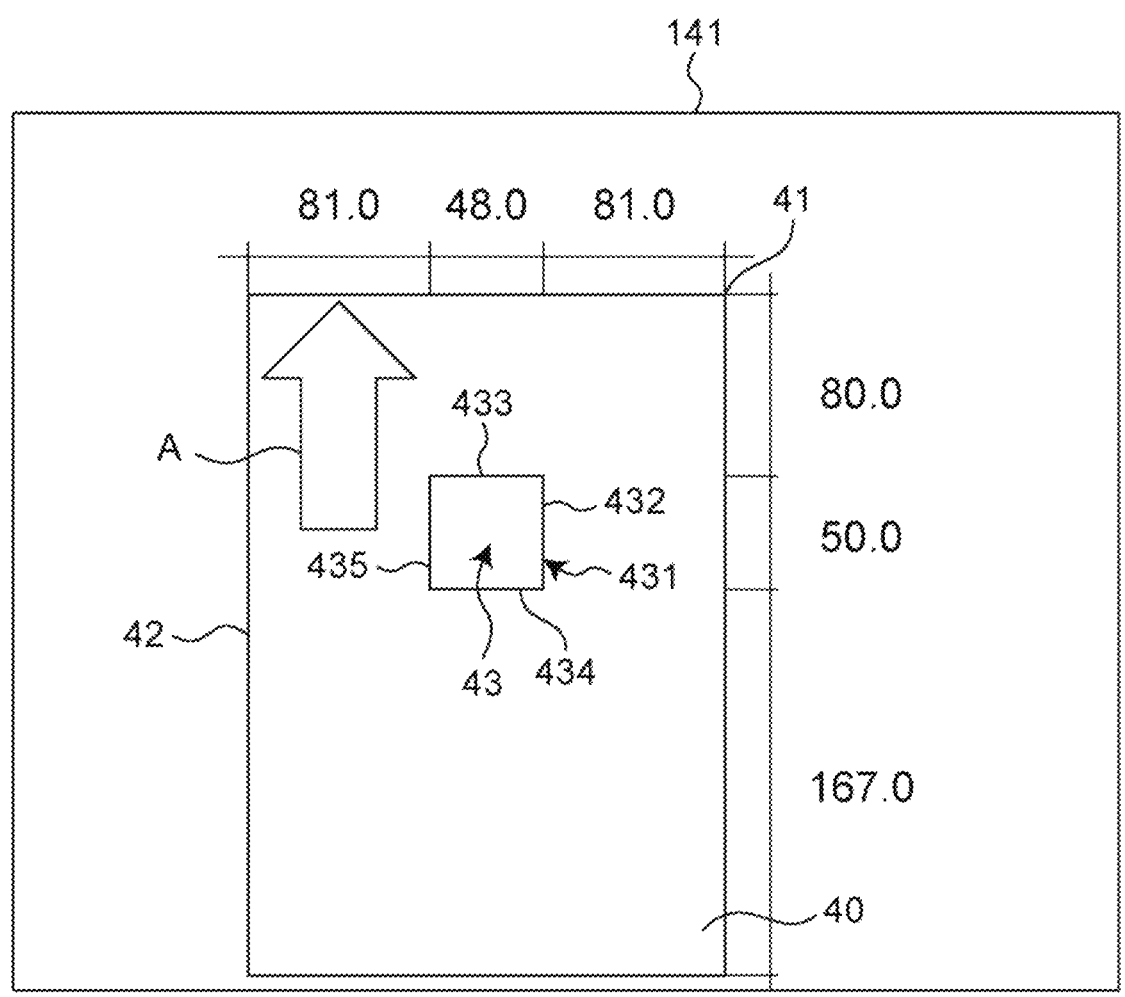
FIG. 2 is a first diagram for explaining setting of a processing position performed by the processing job generation apparatus in FIG. 1.
Figure 3:
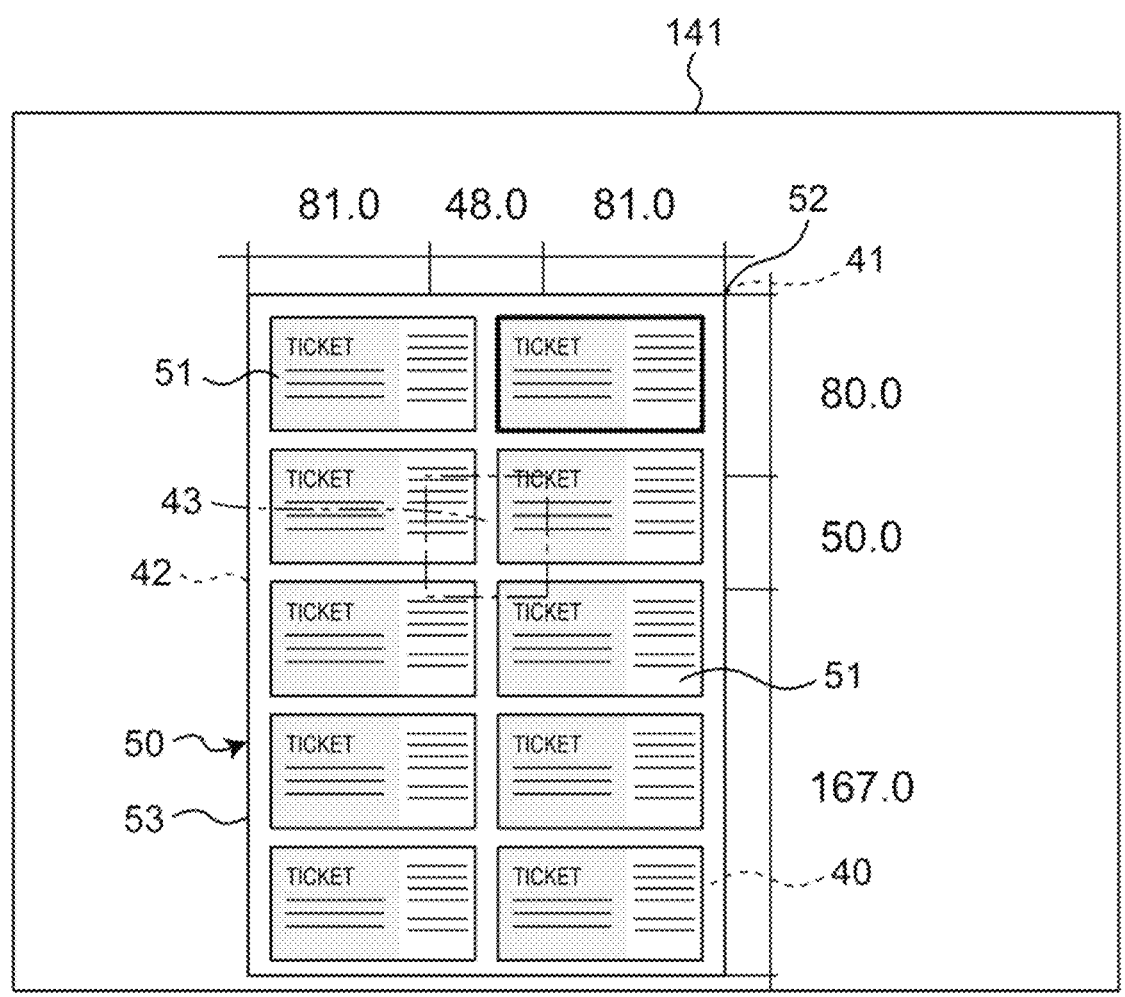
FIG. 3 is a second diagram for explaining setting of a processing position performed by the processing job generation apparatus in FIG. 1.

As shown in FIGS. 2 and 3, the processing position setting unit 102 acquires the size of a sheet 40 from the first information on the print image 50 acquired by the acquisition unit 101 or from information input by a manipulator, and causes a sheet image representing an outer shape of the sheet 40 to be displayed on a display 141 of the display device 14 according to the acquired size of the sheet 40 (for example, A4 size).

FIG. 2 illustrates the display 141 before displaying the print image 50, and FIG. 3 illustrates the display 141 after displaying the print image 50. The print image 50 includes a plurality of product images 51. In this embodiment, the print image 50 includes ten product images 51 arranged in a 5×2 matrix. Both the print image 50 and the product image 51 have a rectangular shape. FIG. 2 illustrates an outline 42 of the sheet 40, a product region 43, and an arrow A indicating a conveying direction of the sheet 40. A reference position 41 is arranged at the upper right corner of the outline 42 of the sheet 40. The product region 43 is a region for setting a range of the product, and the shape of the product region 43 is determined according to the product image 51. In this embodiment, the product region 43 has a rectangular shape. The product is a product obtained as a result of processing the sheet 40 by the sheet processing apparatus 30, and includes, for example, a ticket with a stub and a leaflet with a stub.

The acquired print image 50 is arranged inside the outline 42 of the sheet 40 with reference to either the sheet 40 or the product. Whether the print image 50 is arranged on the basis of the sheet 40 or the product is selected by the manipulator or is automatically selected from the size of the print image 50.

For example, when the print image 50 is arranged with the sheet 40 as a reference, as shown in FIG. 3, the print image 50 is arranged at a position where a reference position 52 of the print image 50 and the reference position 41 of the sheet 40 match. In FIG. 3, the reference position 52 of the print image 50 is arranged at the upper right corner of an outline 53 of the print image 50. When the product is used as a reference, the print image 50 is arranged at a position where the reference position of the product region 43 (for example, the upper right corner of the product region 43) corresponding to one product included in the print image 50 matches the reference position of the print image 50 (for example, the upper right corner of an outline 511 of the product image 51). The position of the product region 43 with respect to the sheet 40 is preset.

The processing position setting unit 102 arranges the print image 50 with respect to the sheet 40 so that the print image 50 and the outer shape of the sheet 40 are displayed on the display 141 in an overlapping state. The arrangement of the print image 50 with respect to the sheet 40 is performed as below in combination with the arrangement of the product region 43, for example.

Figure 6:
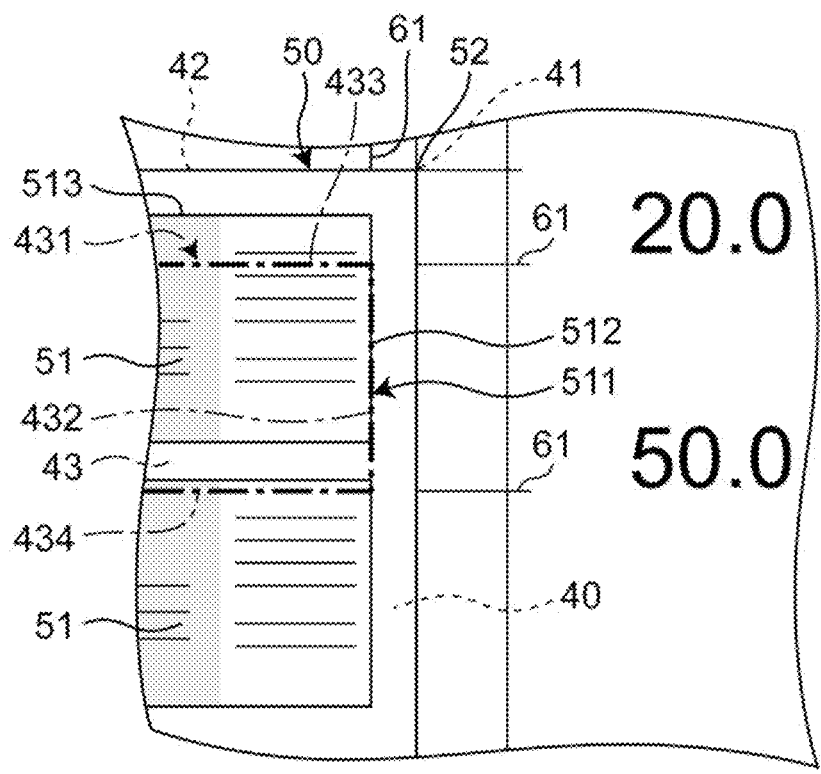
FIG. 6 is a fifth diagram for explaining setting of a processing position using the processing job generation apparatus in FIG. 1.
Figure 7:
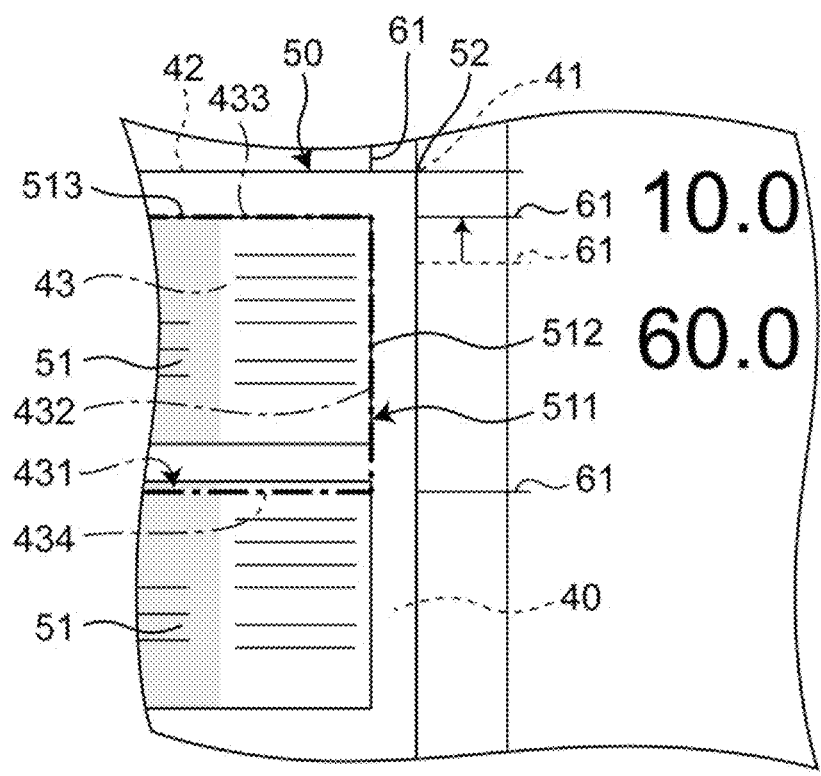
FIG. 7 is a sixth diagram for explaining setting of a processing position using the processing job generation apparatus in FIG. 1.
Figure 8:
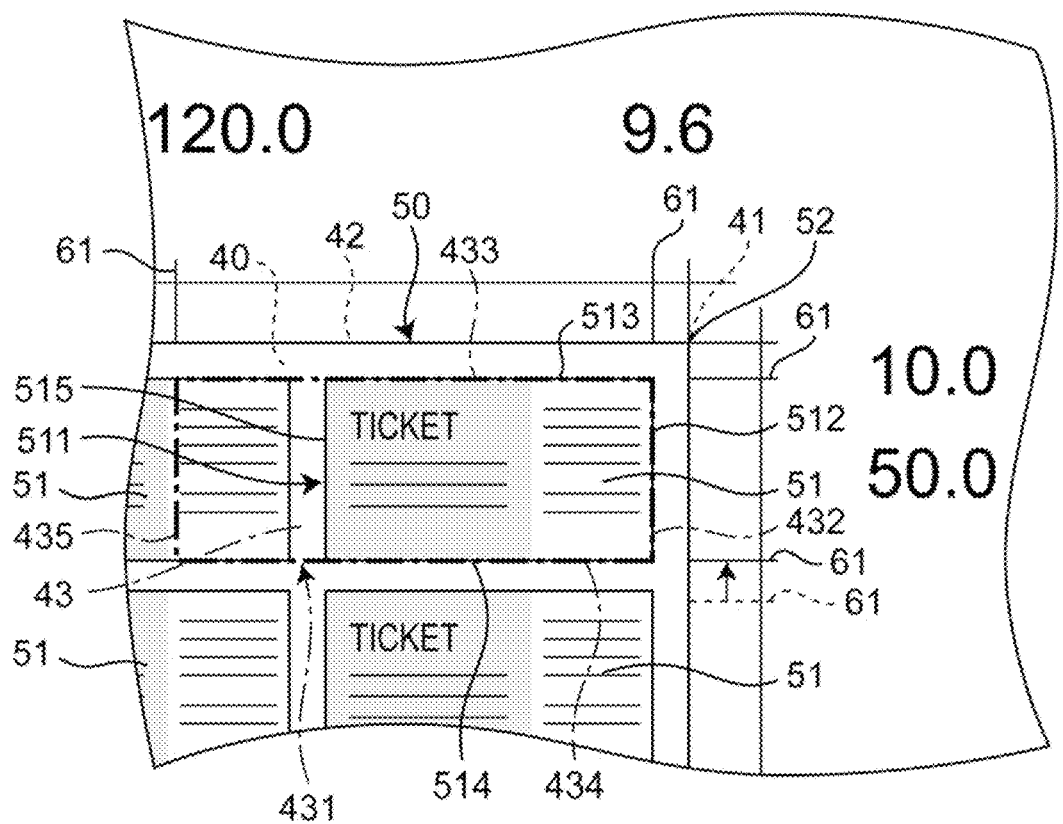
FIG. 8 is a seventh diagram for explaining setting of a processing position using the processing job generation apparatus in FIG. 1.
Figure 9:
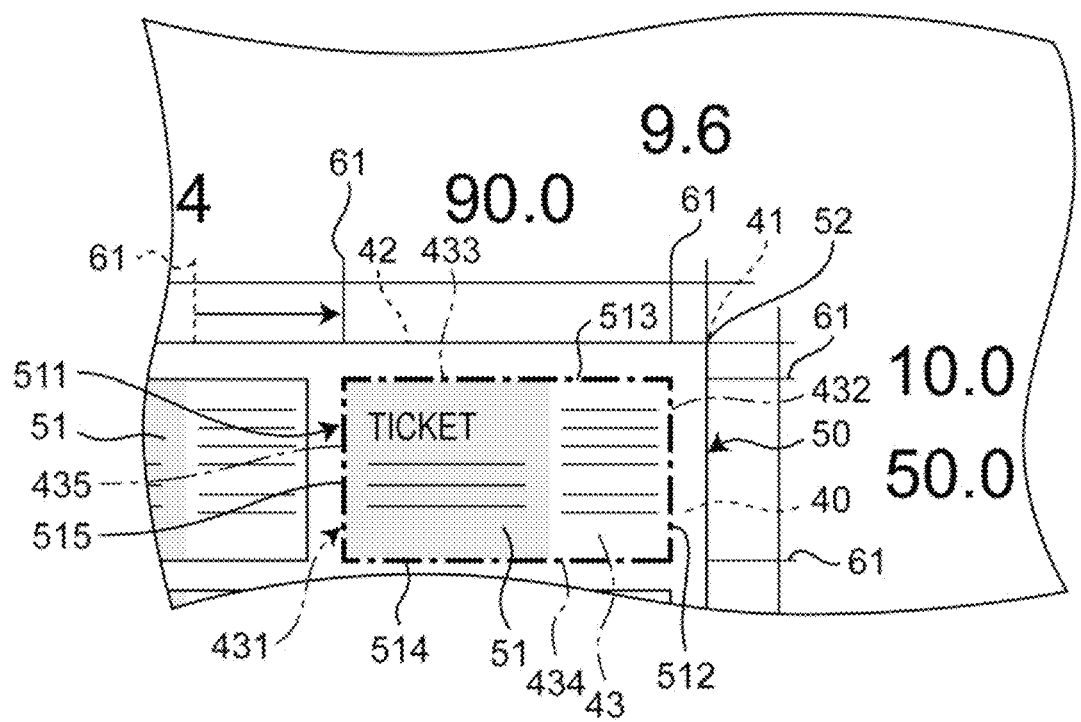
FIG. 9 is an eighth diagram for explaining setting of a processing position using the processing job generation apparatus in FIG. 1.

When arranging the print image 50 with the sheet 40 as a reference, first, the position of the product region 43 (shown in FIG. 2) of the product arranged closest to the reference position 41 is set. The position of the product region 43 is set using, for example, a bar 61 provided along the horizontal direction and the vertical direction of the outline 42 of the sheet 40. For example, as shown in FIGS. 4 to 7, by moving the bar 61 arranged outside the outline 42 of the sheet 40, a right side 432 and an upper side 433 of an outline 431 of the product region 43 are caused to match the two sides of the outline 511 of the product image 51 (in this embodiment, a right side 512 and an upper side 513 of the outline 511 of the product image 51). Then, subsequently, as shown in FIGS. 8 and 9, by moving the bar 61 arranged outside the outline 42 of the sheet 40, a lower side 434 and a left side 435 of the outline 431 of the product region 43 are caused to match the remaining two sides of the outline 511 of the product image 51 (in this embodiment, a lower side 514 and a left side 515 of the outline 511). When the entire outline 431 of the product region 43 matches the outline 511 of the product image 51, the arrangement of the print image 50 with respect to the sheet 40 is completed. As described above, the set position of the product region 43 can be visually recognized through the bar 61. The outline 431 of the set product region 43 is set as a processing position where cutting processing is performed.

Figure 4:
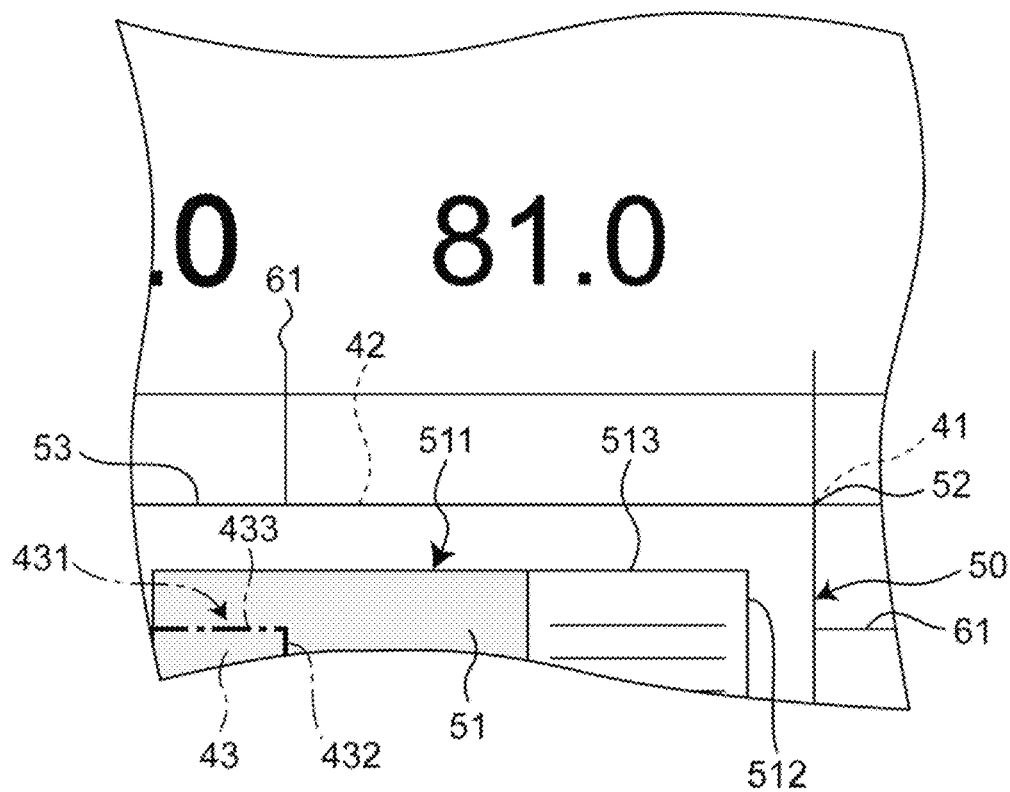
FIG. 4 is a third diagram for explaining setting of a processing position performed by the processing job generation apparatus in FIG. 1.
Figure 5:
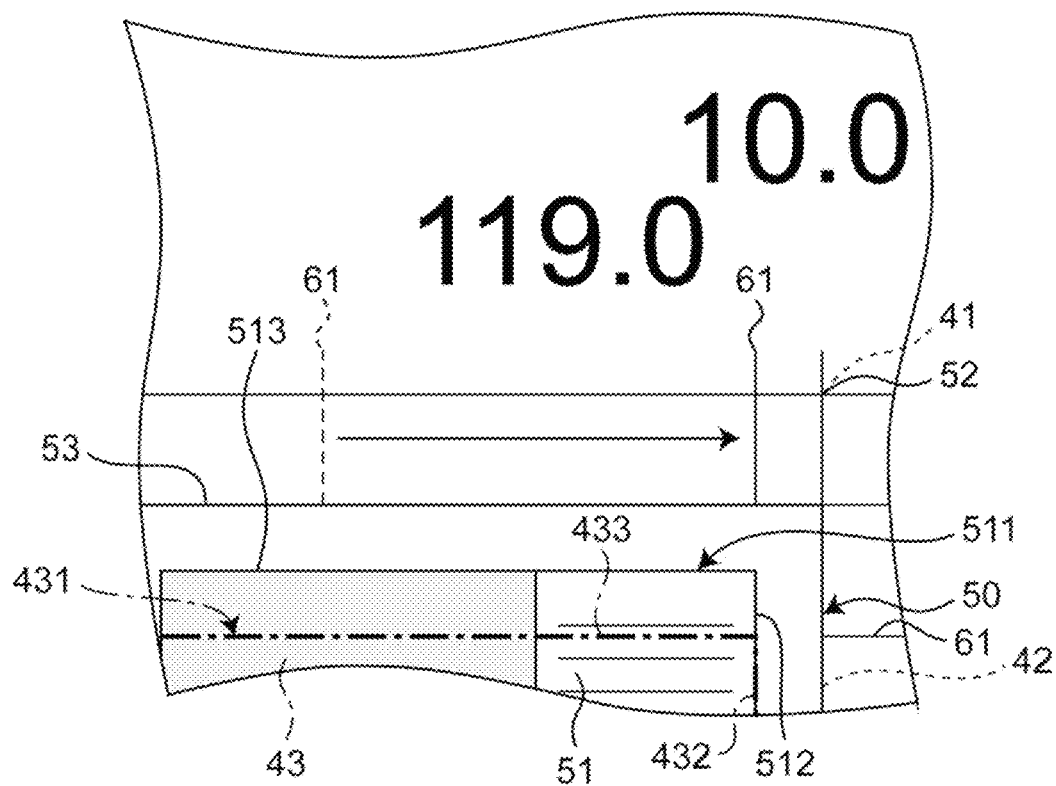
FIG. 5 is a fourth diagram for explaining setting of a processing position using the processing job generation apparatus in FIG. 1.

FIG. 4 illustrates a state before the right side 432 of the outline 431 of the product region 43 matches the right side 512 of the outline 511 of the product image 51, and FIG. 5 illustrates a state after the horizontal bar 61 is moved so that the right side 432 of the outline 431 of the product region 43 matches the right side 512 of the outline 511 of the product image 51. FIG. 6 illustrates a state before the upper side 433 of the outline 431 of the product region 43 matches the upper side 513 of the outline 511 of the product image 51, and FIG. 7 illustrates a state after the vertical bar 61 is moved so that the upper side 433 of the outline 431 of the product region 43 matches the upper side 513 of the outline 511 of the product image 51. FIG. 8 illustrates a state before and after the lower side 434 of the outline 431 of the product region 43 matches the lower side 514 of the outline 511 of the product image 51, and FIG. 9 illustrates a state before and after the left side 435 of the outline 431 of the product region 43 matches the left side 515 of the outline 511 of the product image 51.

Figure 10:
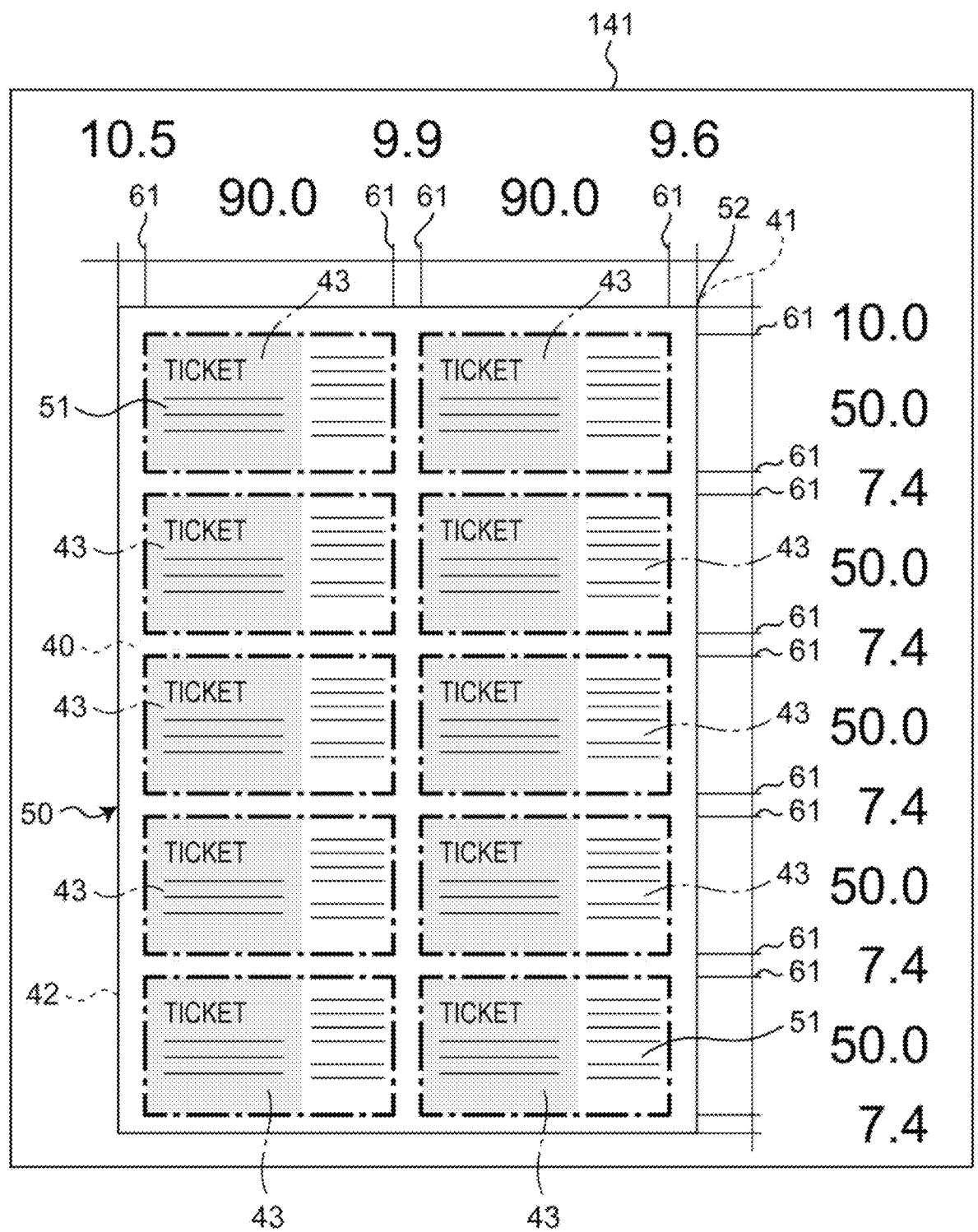
FIG. 10 is a ninth diagram for explaining setting of a processing position using the processing job generation apparatus in FIG. 1.
Figure 11:
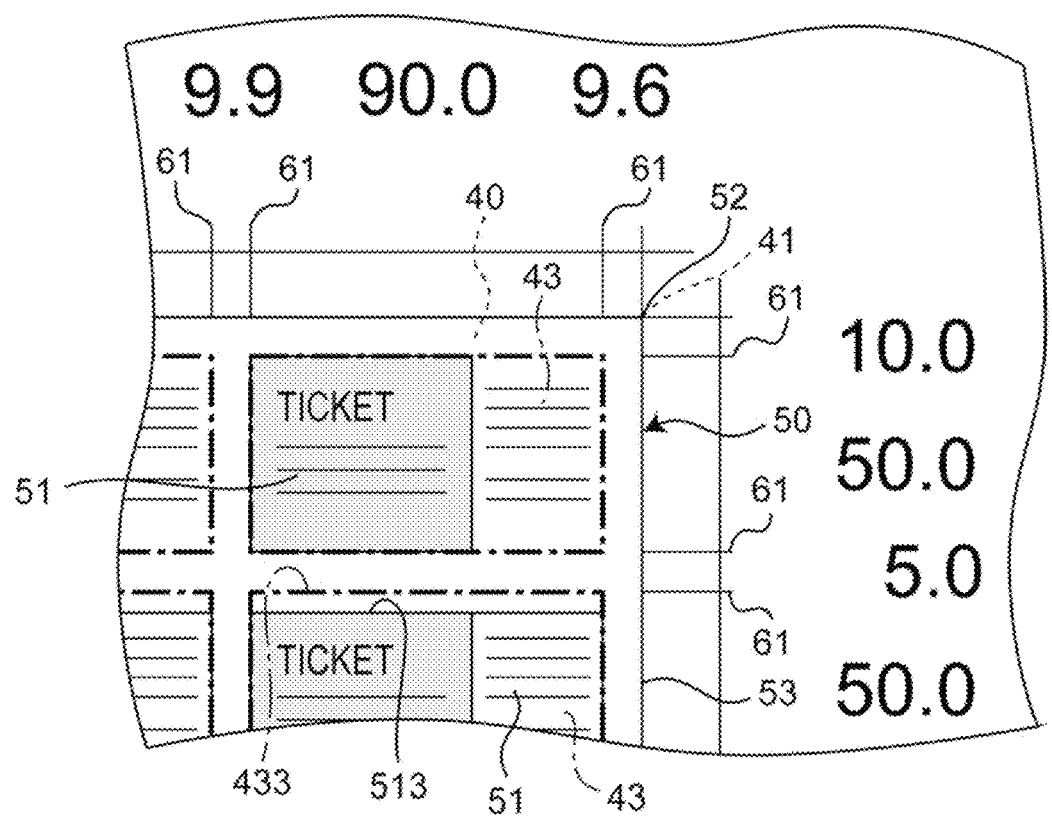
FIG. 11 is a tenth diagram for explaining setting of a processing position using the processing job generation apparatus in FIG. 1.
Figure 12:
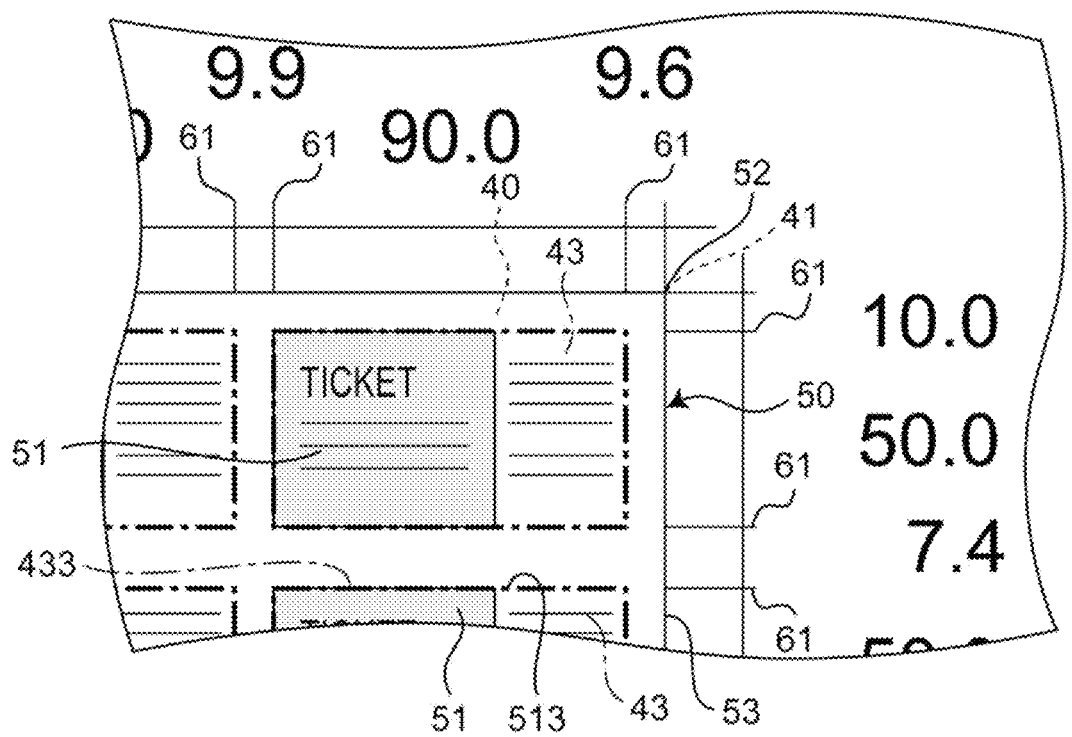
FIG. 12 is an eleventh diagram for explaining setting of a processing position using the processing job generation apparatus in FIG. 1.

When the position of the product region 43 arranged closest to the reference position 41 is set, as shown in FIGS. 10 to 12, the processing position setting unit 102 performs imposition setting. When the print image 50 is arranged with the sheet 40 as a reference, the imposition setting is performed, for example, manually by a manipulator, or automatically, by duplicating the product region 43 set in FIGS. 4 to 9 and setting the position of the duplicated product region 43 for all of the product images 51. When the imposition setting is automatically performed, for example, the arrangement of the product images 51 included in the print image 50 (in this embodiment, five rows and two columns) is input so that the imposition setting is performed.

As shown in FIG. 10, the arrangement of the print image 50 with respect to the sheet 40 after the imposition setting is performed is displayed on the display 141 in a state where the print image 50 and the outer shape of the sheet 40 overlap with each other. At this time, when there is a product image 51 that does not match the set position of the product region 43 (that is, the outline 431) in the product images 51 of the print image 50 displayed on the display 141, the bar 61 is moved so that the product image 51 displayed on the display 141 and the outline 431 of the product region 43 match. For example, as shown in FIG. 11, it is assumed that the upper side 513 of the outline 511 of the second product image 51 from the top in the right column displayed on the display 141 does not match the upper side 433 of the outline 431 of the product region 43. In this case, the bar 61 in the vertical direction corresponding to the upper side 433 of the outline 431 of the second product region 43 from the top in the right column is moved so that, as shown in FIG. 12, the upper side 433 of the outline 431 of the product region 43 matches the upper side 513 of the outline 511 of the product image 51.

When it is confirmed that all the product images 51 displayed on the display 141 match the outline 431 of the set product region 43, the arrangement of the print image 50 on the sheet 40 and the arrangement of the product region 43 are completed.

When the product is used as a reference, as similar to when the print image 50 is arranged with the sheet 40 as a reference, the bar 61 is moved so that the outline 431 of the product region 43 matches the outline 511 of the product image 51, and then imposition setting is performed. The imposition setting is performed, for example, by duplicating the outline 431 of the product region 43 and the product image 51 as one set. When it is confirmed that all the product images 51 displayed on the display 141 match the outline 431 of the set product region 43, the arrangement of the print image 50 on the sheet 40 and the arrangement of the product region 43 are completed.

Next, the processing position setting unit 102 sets the processing position for each product image 51 of the print image 50 whose arrangement has been completed. The setting of the processing position with respect to each product image 51 is performed as below, for example.

Figure 13:
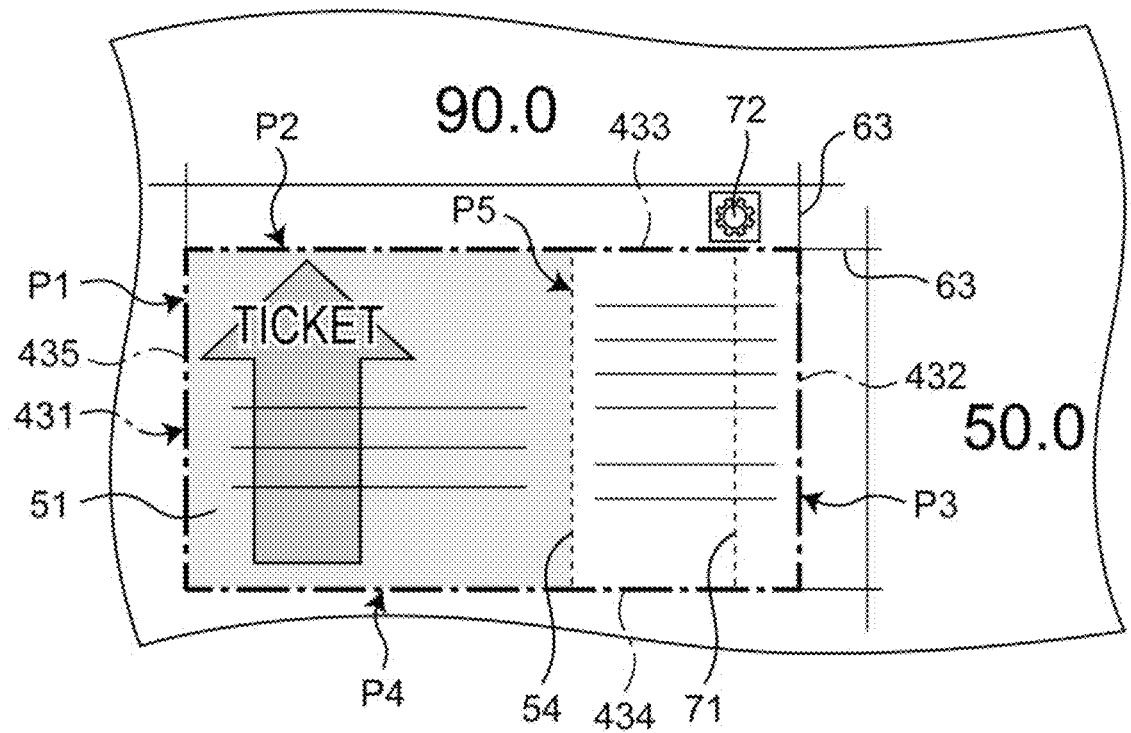
FIG. 13 is a twelfth diagram for explaining setting of a processing position using the processing job generation apparatus in FIG. 1.
Figure 14:
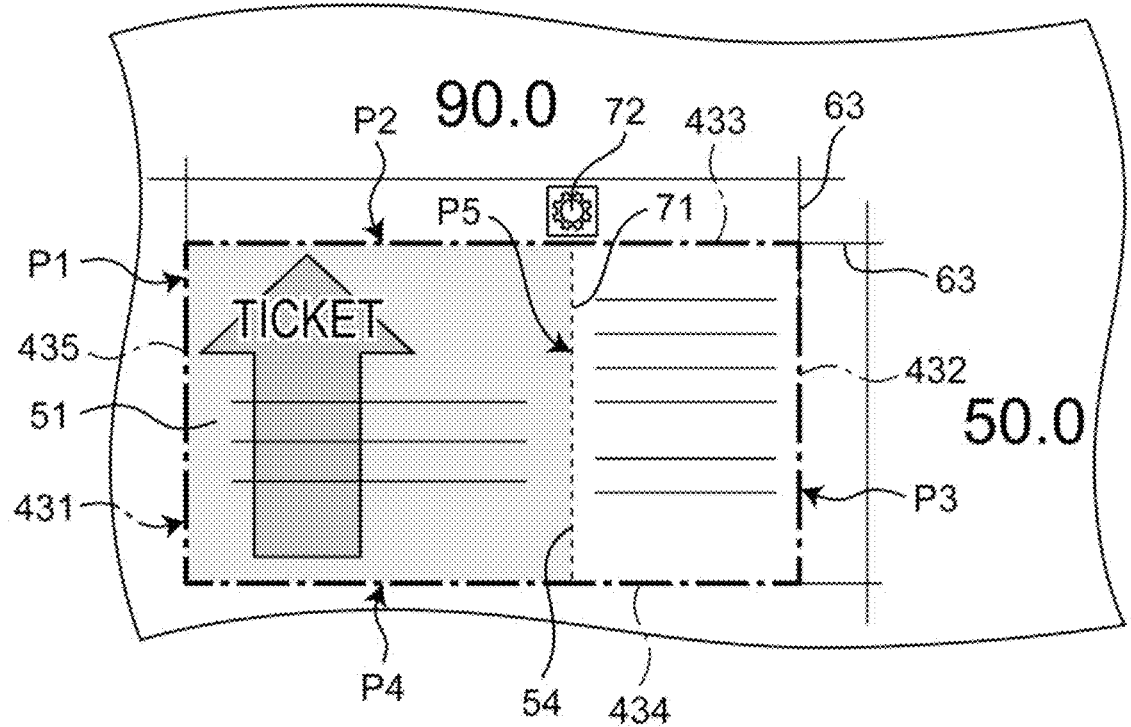
FIG. 14 is a thirteenth diagram for explaining setting of a processing position using the processing job generation apparatus in FIG. 1.

First, as shown in FIGS. 13 and 14, the processing position setting unit 102 causes each product image 51 of the print image 50 and a processing mark set including at least one processing mark 71 indicating a processing position of processing to be performed on the sheet 40 to be simultaneously displayed on the display 141 of the display device 14. In this embodiment, the processing position setting unit 102 causes each product image 51 of the print image 50 and the processing mark set including processing positions P1 to P5 of the processing to be performed to be displayed on the display 141 in an overlapping state.

Next, the processing mark displayed on the display 141 is moved to a desired position. As an example, FIGS. 13 and 14 illustrate the processing position P5 for perforation processing and the processing mark 71 corresponding to the processing position P5. The processing position P5 is set by moving the processing mark 71 to a desired position (for example, a gradation boundary 54 in the horizontal direction of each product image 51). In FIGS. 13 and 14, the processing positions P1 to P4 are shown by solid lines, and the processing position P5 and the processing mark 71 corresponding to the processing position P5 are shown by dotted lines. As described above, the processing positions P1 to P4 are set as the processing positions where cutting processing is performed, when the position of the product region 43 is set, and therefore it is not necessary to set the processing positions P1 to P4 here again.

In this embodiment, the processing type is set together with the setting of the processing position. When the processing position and the processing type are set for all the product images 51, a processing job is generated on the basis of the set processing position and the processing type.

Note that a substantially circular mark 72 that moves together with the processing mark 71 is provided at one end of the processing mark 71. The mark 72 facilitates recognition of the processing mark 71. The mark 72 is configured to change depending on the processing type, and also facilitates recognition of the processing type, in addition to the position of the mark 72. In FIGS. 13 and 14, the mark 72 corresponding to perforation processing is shown. A register mark 63 (an example of an image mark) extending in the vertical direction and the horizontal direction is provided in the upper right corner of each product image 51 of the print image 50. When a distance between the processing mark 71 and the register mark 63 is equal to or less than a predetermined value (for example, 1.0 mm or less), the processing position setting unit 102 automatically moves the processing mark 71 so that the processing mark 71 matches the register mark 63.

In the processing job generation apparatus 10, at least one processing mark set including at least one processing mark 71, at least one print image 50 corresponding to the at least one processing mark set, and a sheet image representing the outer shape of the sheet 40 are displayed on the display device 14 in a state of overlapping with each other. However, the print image 50 and the sheet image may not be displayed on the display device 14. For example, at least one processing mark set including at least one processing mark 71 and a sheet image representing the outer shape of the sheet 40 may be displayed on the display device 14 in a state of overlapping with each other. In this case, for example, the transparency of the print image 50 may be made changeable, and the transparency of the print image 50 may be set to 100% so that the print image 50 is not displayed. Furthermore, the processing mark set including at least one processing mark 71 and the print image 50 associated with information on the sheet 40 may be displayed on the display device 14 in a state of overlapping with each other. In this case, for example, the transparency of the sheet image may be made changeable, and the transparency of the sheet image may be set to 100% so that the sheet 40 is not displayed. When the sheet image is displayed on the display device 14 to set the processing position, the position of the processing mark 71 can be set by inputting a numerical value of the distance from the reference position 41 of the sheet 40.

Figure 15:
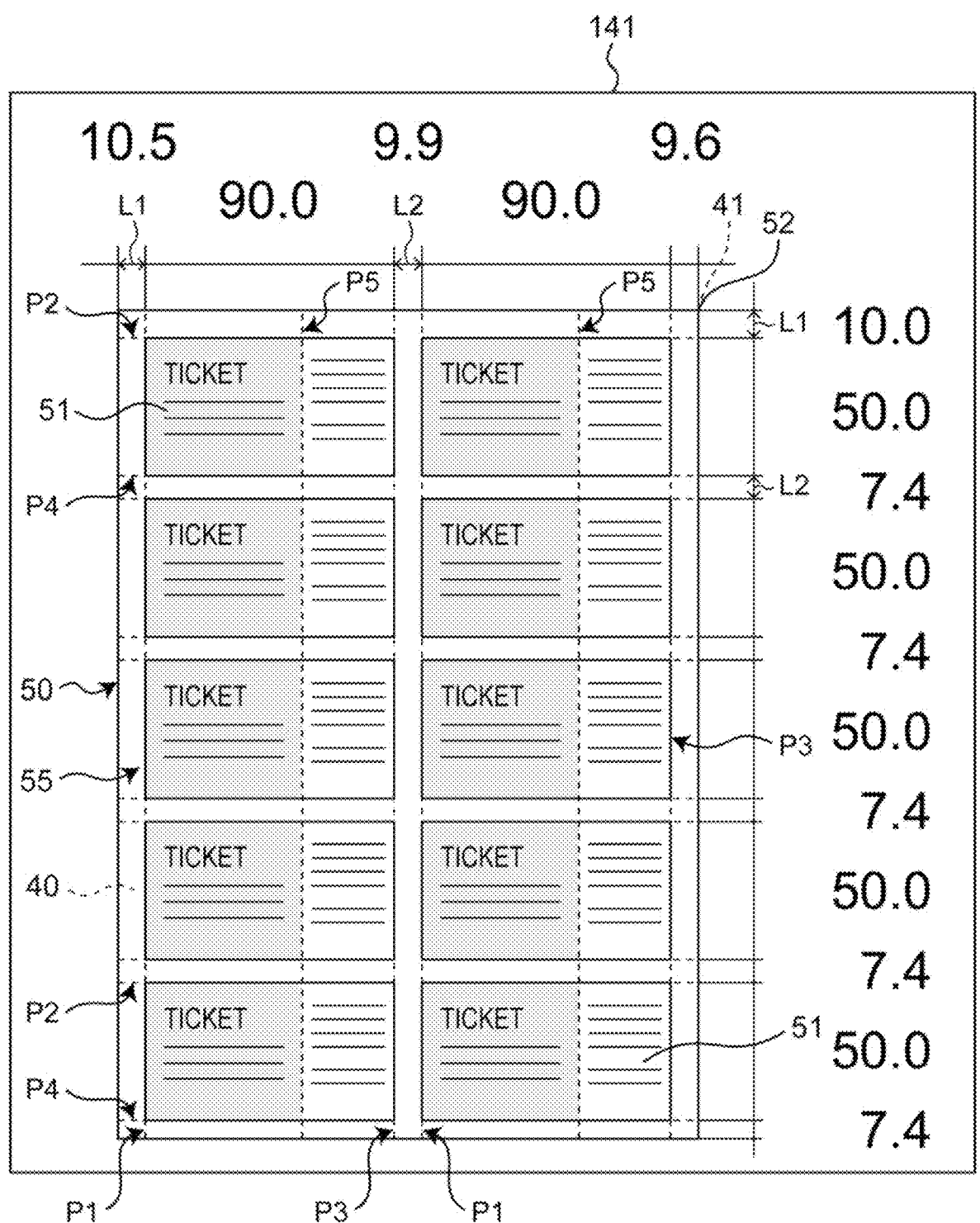
FIG. 15 is a fourteenth diagram for explaining setting of a processing position using the processing job generation apparatus in FIG. 1.

The processing job generation unit 103 generates a processing job on the basis of the processing position set by the processing position setting unit 102. The generated processing job includes, for example, as shown in FIG. 15, information on the arrangement of the print image 50 with respect to the sheet 40, and information on the processing position at which the processing is performed and processing type, and can be displayed in a state of overlapping with the display 141. As described above, the processing job shown in FIG. 15 includes the processing positions P1, P3 for vertical cutting processing, the processing positions P2, P4 for horizontal cutting processing, and the processing position P5 for perforation processing.

According to the processing job generation apparatus 10 of the present embodiment, the following effects can be exhibited.

According to the processing job generation apparatus 10, the print image 50 and the processing mark 71 indicating a processing position of processing to be performed on the sheet 40 are simultaneously displayed on the display device 14, the processing positions P1 to P5 are set on the basis of the print image 50 displayed on the display device 14, and a processing job is generated on the basis of information on the print image 50 and the processing positions P1 to P5 that have been set. With such a configuration, the processing positions P1 to P5 for the print image 50 on the sheet 40 can be intuitively and easily grasped, so that it is possible to realize the processing job generation apparatus 10 that can easily create a processing job.

The processing position setting unit 102 causes the print image 50 and the processing mark 71 to be displayed on the display device 14 in a state of overlapping with each other. With such a configuration, the processing positions P1 to P5 for the print image 50 on the sheet 40 can be easily grasped, so that it is possible to realize the processing job generation apparatus 10 that can easily create a processing job.

When a distance between the processing mark 71 and the register mark 63 set in the print image 50 is equal to or less than a predetermined value, the processing position setting unit 102 automatically moves the processing mark 71 to match the processing mark 71 with the register mark 63. With such a configuration, the processing job can be generated more easily.

The acquisition unit 101 acquires second information on the sheet 40 including a size, and the processing position setting unit 102 causes at least one processing mark set including at least one processing mark 71 and a sheet image representing an outer shape of the sheet 40 to be displayed on the display device 14 in a state of overlapping with each other. With such a configuration, the position of the processing mark 71 with respect to the sheet 40 can be intuitively and easily grasped.

The acquisition unit 101 acquires second information on the sheet 40 including a size, and the processing position setting unit 102 causes at least one processing mark set including at least one processing mark 71, at least one print images 50 corresponding to the at least one processing mark set, and a sheet image representing an outer shape of the sheet 40 to be displayed on the display device 14 in a state of overlapping with each other. With such a configuration, the position of the print image 50 and the set of processing marks 71 with respect to the sheet 40 can be intuitively and easily grasped.

The acquisition unit 101 acquires second information on the sheet 40 including a size, and the processing position setting unit 102 causes a processing mark set including at least one processing mark 71 and the print image 50 associated with information on the sheet 40 to be displayed on the display device 14 in a state of overlapping with each other. With such a configuration, the position of the processing mark 71 with respect to the sheet 40 and the print image 50 can be intuitively and easily grasped.

The processing position setting unit 102 changes a size of the sheet 40 displayed on the display device 14 according to the size of the sheet 40 acquired by the acquisition unit 101. With such a configuration, since it is not necessary to change the size of the sheet 40 according to the size of the print image 50, the processing job can be generated more easily.

The processing job generation apparatus 10 further includes the output unit 13 that outputs the processing job to the outside of the processing job generation apparatus 10, and the processing job output by the output unit 13 includes only the processing positions P1 to P5, the processing positions P1 to P5 and a processing type, the processing positions P1 to P5 and first information on the print image, or the processing positions P1 to P5, the processing type, and the first information. With such a configuration, the generated processing job can be output.

According to the sheet processing system 1 of the present embodiment, the effects below can be exhibited.

The sheet processing system 1 includes the processing job generation apparatus 10 and the sheet processing apparatus 30, wherein the sheet processing apparatus 30 processes the sheet 40 on the basis of the processing job generated by the processing job generation apparatus 10. With such a configuration, it is possible to achieve a sheet processing system that can easily process the sheet 40.

The sheet processing system 1 further includes the printing apparatus 20 that prints the print image 50 on the sheet 40 on the basis of the processing job to generate a printed sheet, and the sheet processing apparatus 30 processes the printed sheet generated by the printing apparatus 20 on the basis of the processing job. With such a configuration, the sheet 40 can be easily and highly accurately processed.

In the processing job generation apparatus 10, the processing position setting unit 102 performs imposition setting, but is not limited to this. The processing position setting unit 102 may not perform imposition setting. In this case, the sheet processing system 1 may include a print image editing apparatus (not shown) that performs imposition on the basis of the processing job generated by the processing job generation apparatus 10. With such a configuration, the sheet 40 can be easily and highly accurately processed.

The sheet processing system 1 and the processing job generation apparatus 10 of the present embodiment can also be configured as below.

The processing position setting unit 102 needs to display the print image 50 and the processing mark 71 on the display device 14 at the same time, and is not limited to the case where the print image 50 and the processing mark 71 are displayed on the display device 14 in an overlapping state.

The display device is not limited to the display device 14 of the sheet processing apparatus 30, and may be a display of an external device such as a personal computer, a smartphone or a tablet PC.

The function of automatically moving the processing mark 71 to match the processing mark 71 with the register mark 63 when a distance between the processing mark 71 and the register mark 63 set in the print image 50 is equal to or less than a predetermined value may be omitted.

The image mark is not limited to the register mark 63 and can be set arbitrarily. For example, a portion in which the amount of change in color of the print image 50 is equal to or larger than a predetermined value may be used as the image mark.

The output unit 13 can be omitted, for example, by forming the processing job generation apparatus 10 integrally with the sheet processing apparatus 30.

It is sufficient that the sheet processing system 1 includes at least the processing job generation apparatus 10 and the sheet processing apparatus 30. The printing apparatus 20 may be omitted.

The acquisition unit 101 may be configured to acquire not only the second information on the sheet 40 but also third information on a product. The third information includes, for example, at least one of the size of the product image 51, the position of the product image 51, and the imposition setting. In this case, the processing position setting unit 102 may cause the processing mark set including at least one processing mark associated with the third information and the print image 50 to be displayed on the display device 14 in an overlapping state.

Figure 16:
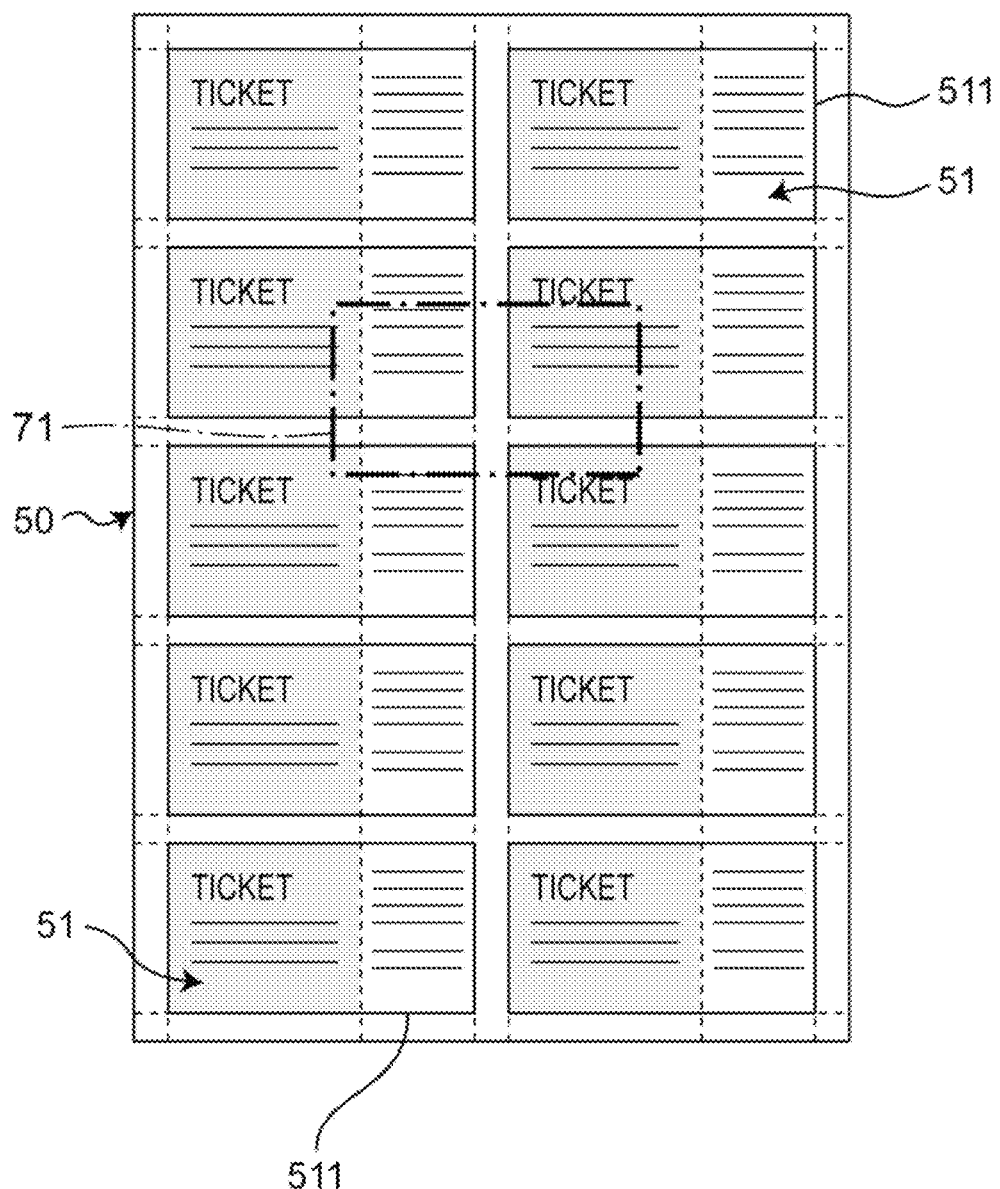
FIG. 16 is a first diagram for explaining a modification of the processing job generation apparatus in FIG. 1.

For example, when the acquisition unit 101 acquires the third information including the size of the product image 51, the processing position setting unit 102 causes the processing mark set to be displayed as shown in FIG. 16 on the display device 14. The processing mark set in FIG. 16 includes a processing mark 71 that has the same size as that of the product image 51, and is not associated with the positional information of the product image 51 (in other words, the processing mark 71 that does not match the outline 511 of the product image 51).

Figure 17:
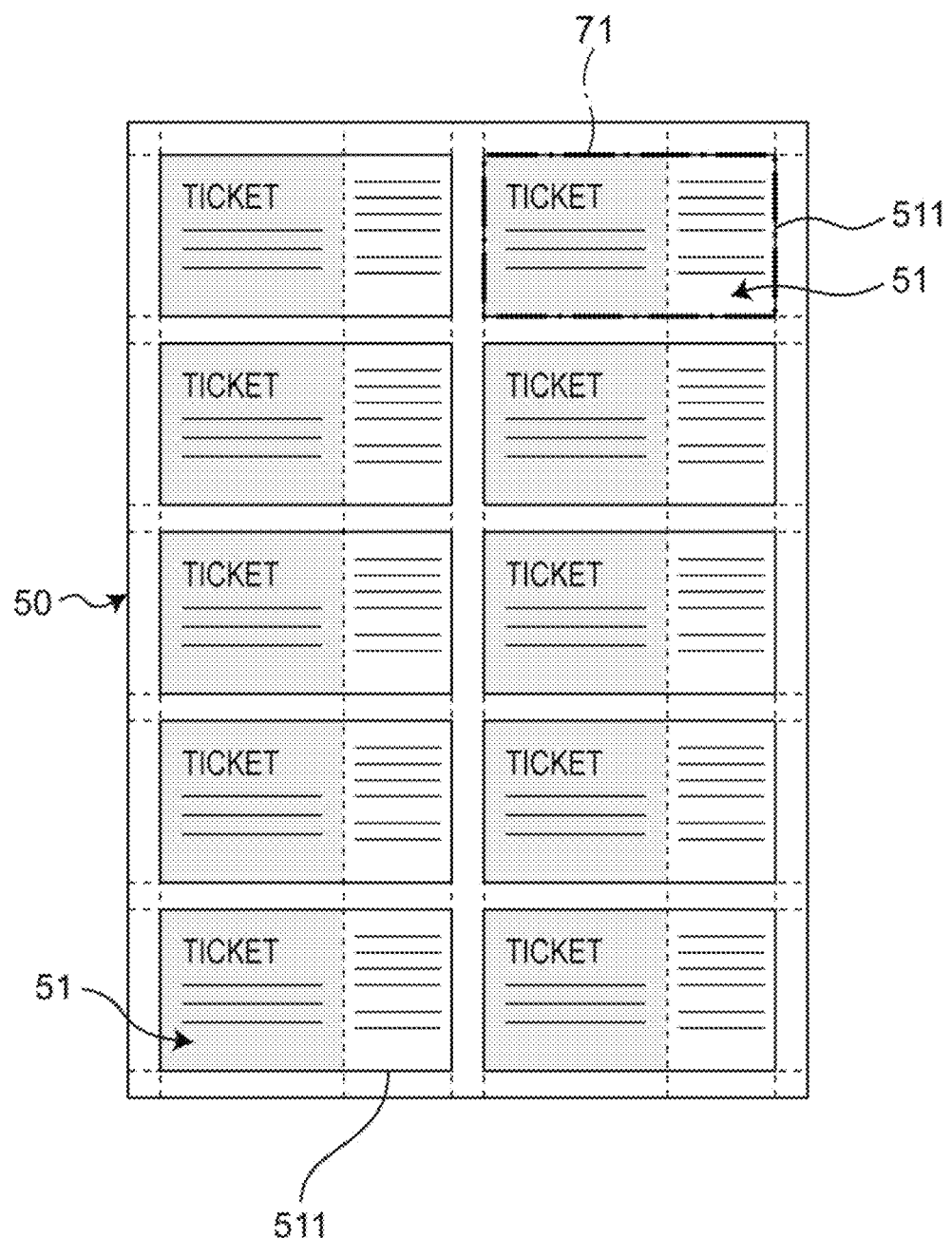
FIG. 17 is a second diagram for explaining a modification of the processing job generation apparatus in FIG. 1.

For example, when the acquisition unit 101 acquires the third information including the size of the product image 51 and the position of the product image 51, the processing position setting unit 102 causes the processing mark set to be displayed as shown in FIG. 17 on the display device 14. The processing mark set in FIG. 17 includes a processing mark 71 that has the same size as that of the product image 51, and is associated with the positional information of the product image 51 (in other words, the processing mark 71 that matches the outline 511 of the product image 51).

Figure 18:
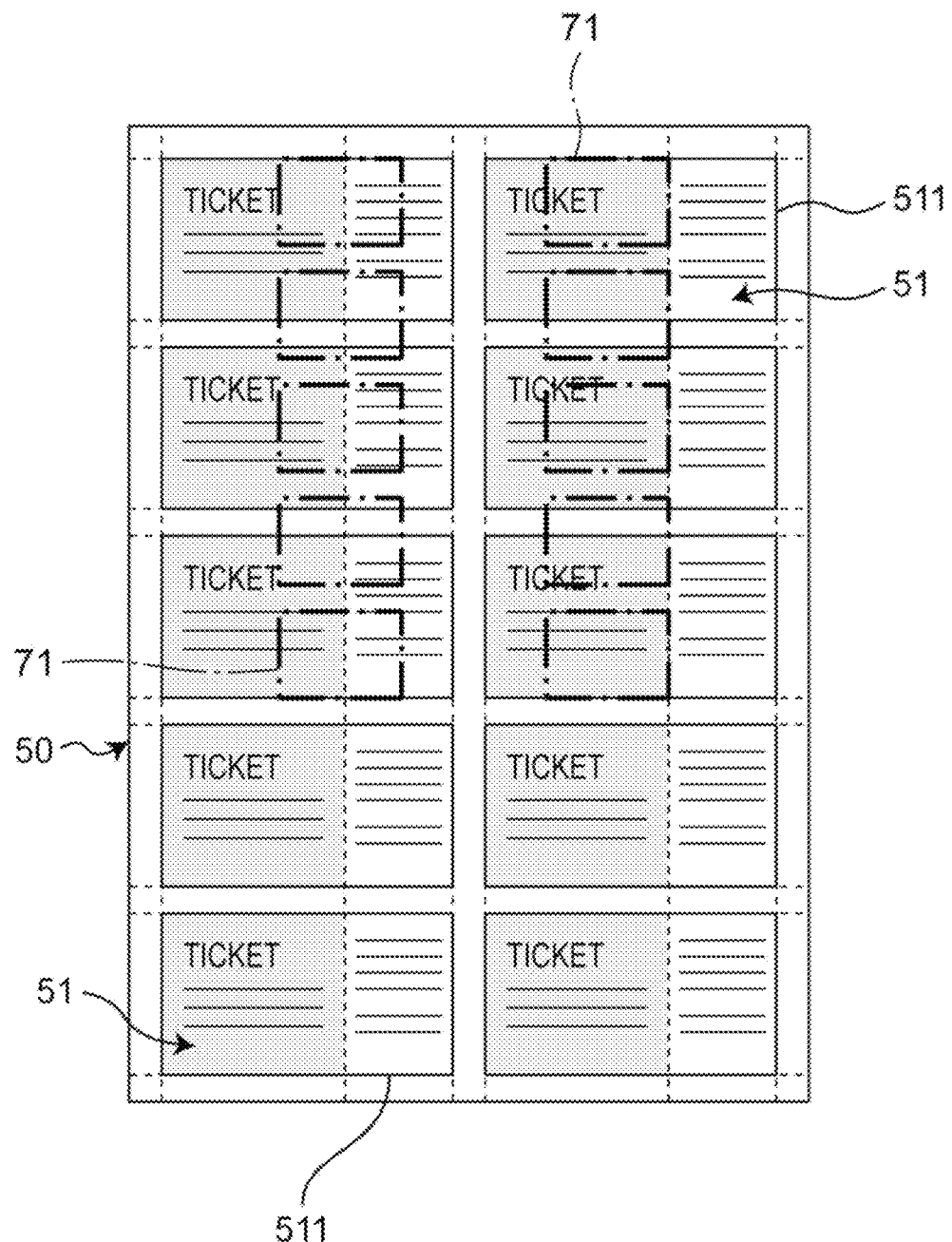
FIG. 18 is a third diagram for explaining a modification of the processing job generation apparatus in FIG. 1.

For example, when the acquisition unit 101 acquires the third information including imposition setting, the processing position setting unit 102 causes the processing mark set to be displayed as shown in FIG. 18 on the display device 14. The mark set shown in FIG. 18 includes the same number of processing mark 71 as the imposition number, each of which has a size smaller than that of the product image 51 and is not associated with the positional information of the product image 51.

Figure 19:
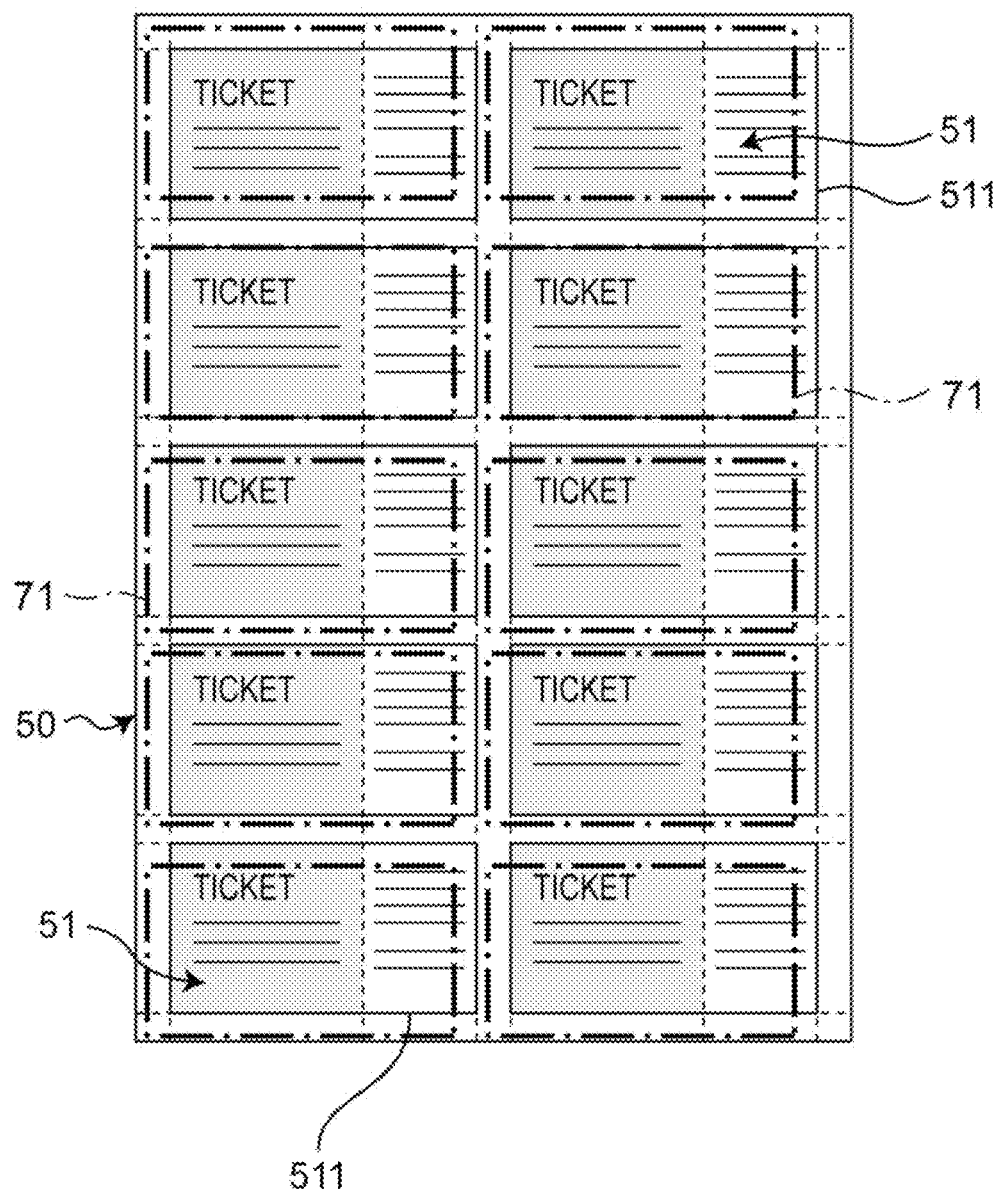
FIG. 19 is a fourth diagram for explaining a modification of the processing job generation apparatus in FIG. 1.

For example, when the acquisition unit 101 acquires the third information including the imposition setting and the size of the product image 51, the processing position setting unit 102 causes the processing mark set to be displayed as shown in FIG. 19 on the display device 14. The mark set shown in FIG. 19 includes the same number of processing mark 71 as the imposition number, each of which has the same size as that of the product image 51 and is not associated with the positional information of the product image 51.

Figure 20:
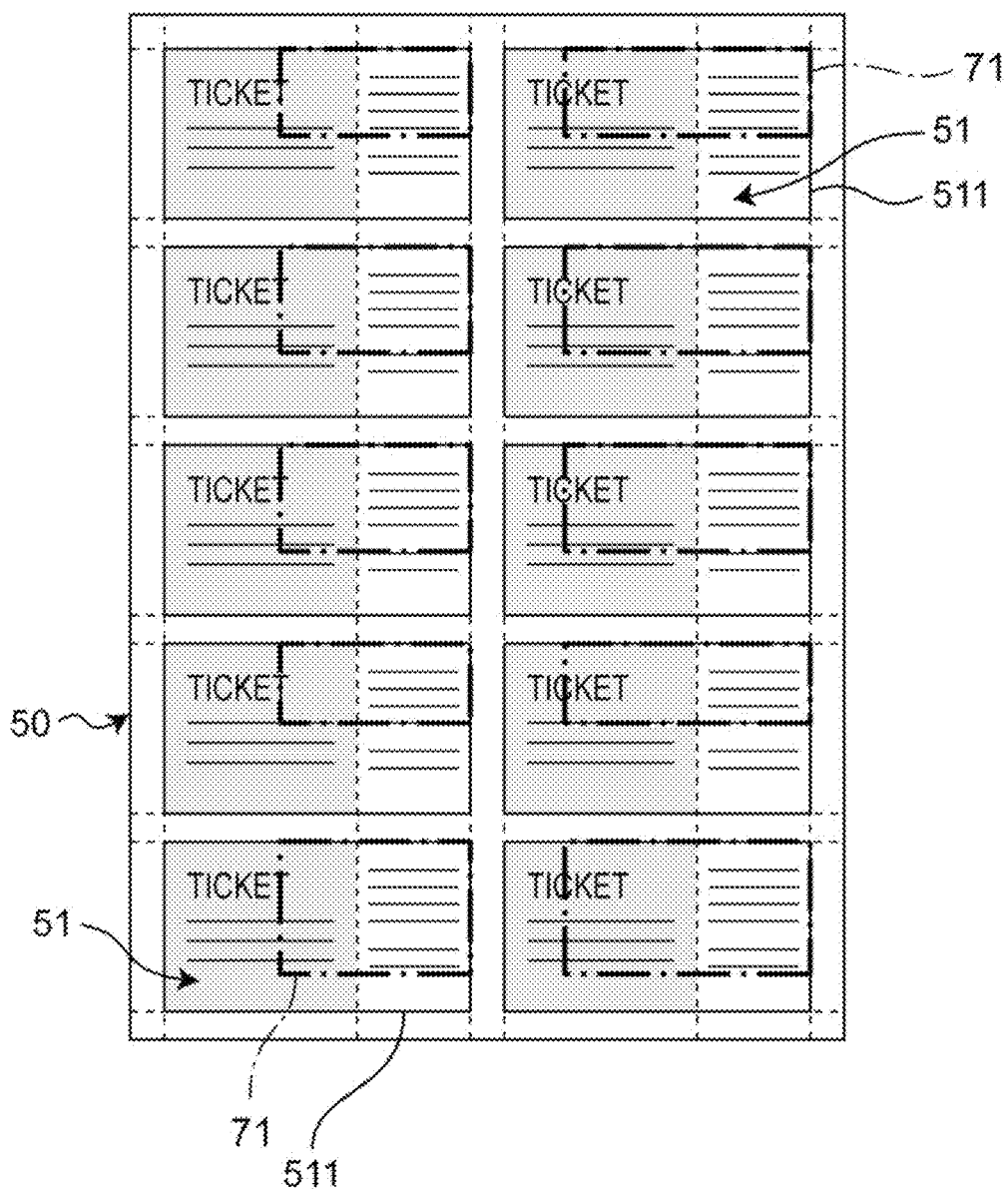
FIG. 20 is a fifth diagram for explaining a modification of the processing job generation apparatus in FIG. 1.

For example, when the acquisition unit 101 acquires the third information including the imposition setting and the position of the product image 51, the processing position setting unit 102 causes the processing mark set to be displayed as shown in FIG. 20 on the display device 14. The mark set shown in FIG. 20 includes the same number of processing mark 71 as the imposition number, each of which has a size smaller than that of the product image 51 and is associated with the positional information of the product image 51. In FIG. 20, the upper right corner of each processing mark 71 matches the upper right corner of the outline 511 of the product image 51.

Figure 21:
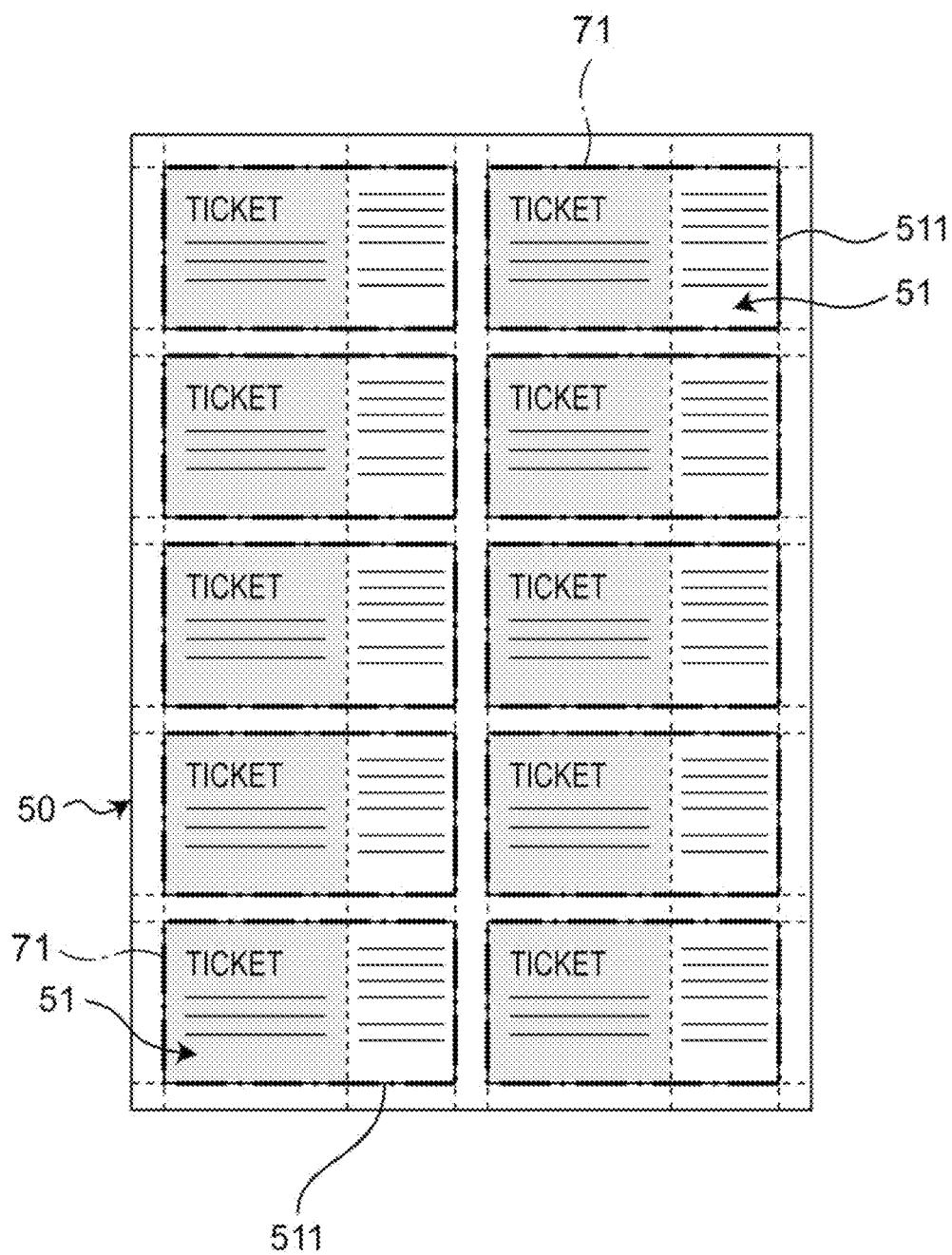
FIG. 21 is a sixth diagram for explaining a modification of the processing job generation apparatus in FIG. 1.

For example, when the acquisition unit 101 acquires the third information including the imposition setting, the size of the product image 51, and the position of the product image 51, the processing position setting unit 102 causes the processing mark set to be displayed as shown in FIG. 21 on the display device 14. The mark set shown in FIG. 21 includes the same number of processing mark 71 as the imposition number, each of which has the same size as that of the product image 51 and is associated with the positional information of the product image 51.

The acquisition unit 101 may be configured to acquire fourth information on a blank region 55 (shown in FIG. 15) of the print image 50 in which the product image 51 is not arranged, from the third information. The fourth information can include, for example, a distance L1 (shown in FIG. 15) between the outline 53 of the sheet 40 and the outline 511 of the product image 51, and/or a distance L2 (shown in FIG. 15) between the outlines 511 of the adjacent product images 51.

With such a configuration, it is possible to intuitively and easily grasp the position of the set of the "product image 51 and the processing mark 71" with respect to the print image 50 on the sheet 40.

The processing position setting unit 102 may be configured to set the position of the processing mark on the basis of a numerical value input by a manipulator. Fine adjustment, which is difficult with a pointing device or the like, can be easily performed by inputting a numerical value, so that the position of the processing mark can be set more accurately.

By properly combining the arbitrary embodiments or modifications of the aforementioned various embodiments or modifications, the effects possessed by them can be produced. Further, the embodiments may be combined with each other, the examples may be combined with each other, or an embodiment and an example may be combined with each other, and the features of the different embodiments or examples may be combined with each other.

In the present invention, it is possible to intuitively and easily grasp the processing position for the print image on the sheet, and thus it is possible to provide a processing job generation apparatus that can easily create a processing job, so that the present invention has a great industrial application value.

REFERENCE SIGNS LIST 1 sheet processing system
10 processing job generation apparatus
101 acquisition unit
102 processing position setting unit
103 processing job generation unit
11 CPU
12 storage unit
13 output unit
14 display device
141 display
20 printing apparatus
30 sheet processing apparatus
40 sheet
41 reference position
42 outline
43 product region
431 outline of the product region
50 print image
51 product image
511 outline of the product image
52 reference position
53 outline of the print image
54 gradation boundary
61 bar
63 register mark
71 processing mark
72 mark
P1-P5 processing position

The invention claimed is:

1. A processing job generation apparatus that generates, using a display device, a processing job of a sheet processing apparatus capable of processing a sheet on which a print image is printed according to the processing job, the processing job generation apparatus comprising:
an acquisition unit that acquires image data for the print image; and
a processing position setting unit is configured to:
cause the print image to be printed on the sheet and a processing mark indicating a processing position of processing to be performed on the sheet to be simultaneously displayed on the display device, and
move the processing mark to any desired position on the print image so that the processing mark is in alignment with the desired position on the print image displayed on the display device,
wherein the processing job generation apparatus generates the processing job based on the image data and the processing position that has been set.

2. The processing job generation apparatus according to claim 1, wherein
the processing position setting unit causes the print image and the processing mark to be displayed on the display device in a state of overlapping with each other.

3. The processing job generation apparatus according to claim 1, wherein
when a distance between the processing mark and an image mark set in the print image is equal to or less than a predetermined value, the processing position setting unit automatically moves the processing mark to match the processing mark with the image mark.

4. The processing job generation apparatus according to claim 1, wherein
the acquisition unit acquires second information on the sheet including a size, and
the processing position setting unit causes a processing mark set including the processing mark and a sheet image representing an outer shape of the sheet to be displayed on the display device in a state of overlapping with each other.

5. The processing job generation apparatus according to claim 4, wherein
the processing position setting unit causes the processing mark set, the print image corresponding to the processing mark set, and the sheet image in a state of overlapping with each other.

6. The processing job generation apparatus according to claim 1, wherein
the acquisition unit acquires second information on the sheet including a size, and
the processing position setting unit causes a processing mark set including the processing mark and the print image associated with the second information to be displayed on the display device in a state of overlapping with each other.

7. The processing job generation apparatus according to claim 4, wherein
the processing position setting unit changes a size of the sheet displayed on the display device according to the size of the sheet acquired by the acquisition unit.

8. The processing job generation apparatus according to claim 1, wherein
the print image includes a product image,
the acquisition unit acquires third information on a product including at least one of a size of the product image and imposition setting, and the processing position setting unit causes a processing mark set including the processing mark associated with the third information and the print image to be displayed on the display device in a state of overlapping with each other.

9. The processing job generation apparatus according to claim 8, wherein
the third information includes a position of the product.

10. The processing job generation apparatus according to claim 9, wherein
the acquisition unit acquires fourth information on a blank region of the print image in which the product image is not arranged, from the third information, and
the processing position setting unit causes the processing mark set associated with the fourth information and the print image to be displayed on the display device in a state of overlapping with each other.

11. The processing job generation apparatus according to claim 1, wherein
the print image includes a product image,
the acquisition unit acquires fourth information on a blank region of the print image in which the product image is not arranged,
the fourth information includes a distance between an outline of the sheet and an outline of the product image, and
the processing position setting unit causes a processing mark set including the processing mark associated with the fourth information and the print image to be displayed on the display device in a state of overlapping with each other.

12. The processing job generation apparatus according to claim 1, wherein
the print image includes a plurality of the product images,
the acquisition unit acquires fourth information on a blank region of the print image in which the product image is not arranged,
the fourth information includes at least one of a distance between an outline of the sheet and an outline of the product image and a distance between outlines of adjacent product images of the plurality of product images, and
the processing position setting unit causes a processing mark set including the processing mark associated with the fourth information and the print image to be displayed on the display device in a state of overlapping with each other.

13. The processing job generation apparatus according to claim 1, wherein
the processing position setting unit is configured to set the position of the processing mark on basis of an input numerical value.

14. The processing job generation apparatus according to claim 1, further comprising an output unit that outputs the processing job to an outside of the processing job generation apparatus,
wherein the processing job output by the output unit includes only the processing position, the processing position and a processing type, the processing position and the image data, or the processing position, the processing type, and the image data.

15. A sheet processing system at least comprising:
the processing job generation apparatus according to claim 1; and
the sheet processing apparatus, wherein
the sheet processing apparatus processes the sheet on basis of the processing job generated by the processing job generation apparatus.

16. The processing job generation apparatus according to claim 1, wherein
the processing to be performed on the sheet does not include bookbinding.

17. The processing job generation apparatus according to claim 1, wherein
the processing to be performed on the sheet is either vertical cutting processing, horizontal cutting processing, perforation processing, vertical crease processing, horizontal crease processing, rounding processing, embossing, or pseudo-bonding.

18. A processing job generation apparatus that generates, using a display device, a processing job of a sheet processing apparatus capable of processing a sheet on which a print image is printed according to the processing job, the processing job generation apparatus comprising:
an acquisition unit that acquires image data for the print image; and
a processing position setting unit is configured to cause the print image and a processing mark indicating a processing position of processing to be performed on the sheet to be simultaneously displayed on the display device, and sets the processing position based on the print image displayed on the display device, wherein
the processing job generation apparatus generates the processing job based on the image data and the processing position that has been set, and
when a distance between the processing mark and an image mark set in the print image is equal to or less than a predetermined value, the processing position setting unit automatically moves the processing mark to match the processing mark with the image mark.

* * * * *